United States Patent
De Proft et al.

(10) Patent No.: US 12,481,180 B2
(45) Date of Patent: Nov. 25, 2025

(54) OPTICAL DEVICE FOR MODULATING INCIDENT LIGHT

(71) Applicant: Swave BV, Leuven (BE)

(72) Inventors: Anabel De Proft, Leuven (BE); Xavier Rottenberg, Kessel-Lo (BE); Kristof Lodewijks, Wilsele (BE)

(73) Assignee: SWAVE BV, Leuven (BE)

( * ) Notice: Subject to any disclaimer, the term of this patent is extended or adjusted under 35 U.S.C. 154(b) by 354 days.

(21) Appl. No.: 17/628,657

(22) PCT Filed: Jul. 9, 2020

(86) PCT No.: PCT/EP2020/069427
§ 371 (c)(1),
(2) Date: Jan. 20, 2022

(87) PCT Pub. No.: WO2021/013572
PCT Pub. Date: Jan. 28, 2021

(65) Prior Publication Data
US 2022/0252909 A1  Aug. 11, 2022

(30) Foreign Application Priority Data
Jul. 24, 2019 (EP) .................................... 19188130

(51) Int. Cl.
*G02F 1/01* (2006.01)
*G03H 1/02* (2006.01)
*G03H 1/22* (2006.01)

(52) U.S. Cl.
CPC ............. *G02F 1/0147* (2013.01); *G03H 1/02* (2013.01); *G03H 1/2294* (2013.01);
(Continued)

(58) Field of Classification Search
CPC .. G03H 1/02; G03H 1/2294; G03H 201/0224; G03H 2225/11; G03H 2225/12;
(Continued)

(56) References Cited

U.S. PATENT DOCUMENTS

| 5,592,444 A | * | 1/1997 | Alon | ...................... G11B 7/127 |
| 2002/0024688 A1 | * | 2/2002 | Ogasawara | .......... G11B 7/1369 |

(Continued)

FOREIGN PATENT DOCUMENTS

EP   3521912 A1   8/2019

OTHER PUBLICATIONS

Ee et al., "Electrically programmable multi-purpose nonvolatile metasurface based on phase change materials", Jan. 21, 2019, Physica Scripta, 94, pp. 1-5. (Year: 2019).*
(Continued)

*Primary Examiner* — Chad H Smith
(74) *Attorney, Agent, or Firm* — Akona IP PC (57) ABSTRACT

According to an aspect of the present inventive concept there is provided an optical device (1) for modulating incident light (L), comprising a resonance defining layer structure (110) comprising an optical state change material (112), and an electrode layer (120) comprising at least two spaced-apart electrode elements (121, 122, 123). The electrode elements are individually addressable and arranged to cause an optical state change of a portion of the optical state change material between a first state and a second state, wherein the portion forms a geometric structure (131, 132, 133, 134, 135, 136) defined by the arrangement of the at least two spaced-apart electrode elements. The optical state change material is configured to alter an optical response of the optical device upon the optical state change between the first state and the second state, thereby determining the modulation of the incident light.

22 Claims, 5 Drawing Sheets

(52) U.S. Cl.
CPC ...... *G02F 2202/30* (2013.01); *G02F 2203/15* (2013.01); *G03H 2001/0224* (2013.01); *G03H 2225/12* (2013.01); *G03H 2225/22* (2013.01); *G03H 2225/32* (2013.01)

(58) Field of Classification Search
CPC ........... G03H 2225/13; G03H 2225/22; G03H 2225/32
See application file for complete search history.

(56) References Cited

U.S. PATENT DOCUMENTS

| | | | |
|---|---|---|---|
| 2015/0160612 A1 | 6/2015 | Jung et al. | |
| 2020/0227632 A1* | 7/2020 | Kim | G02B 26/06 |

OTHER PUBLICATIONS

Hosseini, Peiman, C. David Wright, and Harish Bhaskaran. "An optoelectronic framework enabled by low-dimensional phase-change films." Nature 511.7508 (2014): 206-211.
Wang, Qian, et al., "Optically reconfigurable metasurfaces and photonic devices based on phase change materials." Nature Photonics 10.1 (2016): 60-65.
Seung-Yeol Lee et al., "Holographic image generation with a thin-film resonance caused by chalcogenide phase-change material", Scientific Reports, vol. 7, No. 1, Jan. 24, 2017 (Jan. 24, 2017), XP055654895, DOI: 10.1038/srep41152 figure 5, p. 6, last 2 sentences—p. 7 until "Conclusion" section.
Hwang, Chi-Young, et al., "Switchable subwavelength plasmonic structures with phase-change materials for reflection-type active metasurfaces in the visible region." Applied Physics Express 10.12 (2017): 122201.
Niloufar Raeis-Hosseini et al., "Metasurfaces Based on Phase-Change Material as a Reconfigurable Platform for Multifunctional Devices", Materials, vol. 10, No. 9, Sep. 6, 2017 (Sep. 6, 2017), p. 1046, XP055654915, CH ISSN: 1996-1944, DOI: 10.3390/ma10091046 figures 6, 7, 8, 10.
Forouzmand, Ali, and Hossein Mosallaei. "Dynamic beam control via Mie-resonance based phase-change metasurface: a theoretical investigation." Optics express 26, No. 14 (2018): 17948-17963.
Kafaie Shirmanesh, Ghazaleh, et al. "Dual-gated active metasurface at 1550 nm with wide (> 300) phase tunability." Nano letters 18.5 (2018): 2957-2963.
Zhang, Ming, et al. "Plasmonic metasurfaces for switchable photonic spin-orbit interactions based on phase change materials." Advanced Science 5.10 (2018): 1800835.
Cui, Tong, Benfeng Bai, and Hong-Bo Sun. "Tunable metasurfaces based on active materials." Advanced Functional Materials 29.10 (2019): 1806692.
Ee, Ho-Seok, and Ritesh Agarwal. "Electrically programmable multi-purpose nonvolatile metasurface based on phase change materials." Physica Scripta 94.2 (2019): 025803.
Yong-Hae Kim et al., "Towards 1.5 micrometer pixel pitch holographic display using Ge2Sb2Te5 phase change material", Digital Holography and Three-Dimensional Imaging 2019, May 20, 2019 (May 20, 2019), page M4A.2, XP055654952, Washington, D.C. DOI: 10.1364/DH.2019.M4A.2 ISBN: 978-1-943580-59-0 the whole document figures 1a, 1b.
International Search report and Written Opinion for application No. PCT/EP2020/069427 date of mailing Sep. 28, 2020.

* cited by examiner

OPTICAL DEVICE FOR MODULATING INCIDENT LIGHT

TECHNICAL FIELD

The present inventive concept relates to an optical device for modulating incident light. The present inventive concept further relates to a method a method of modulating light incident to the optical device.

BACKGROUND

A holographic image is formed by controlling a light field in three dimensions. This is typically done by an array of optical devices, which each have an optical response, i.e. a specific way of altering incident light, to provide at least a part of a light field. To form an optical response, the optical device may have a metasurface consisting of arrays of sub-wavelength features.

When a holographic image is to be changed with time, for instance to create a series of holographic images or to generate a holographic video, the optical response of the array of optical devices may need to be altered. In this regard, it is known to provide an array of optical devices, which each have a separate addressing port and can be changed electrically, by a laser, or the like.

To obtain a sufficiently high efficiency, i.e. in terms of a ratio of modulated light to incident light, phase modulation is typically preferred over amplitude modulation. It is known in the field of metasurfaces to use modulation such as a Pancharatnam-Berry (PB) phase modulation scheme, in which the phase of the light is determined by the geometry over which the light is propagating, rather than the distance. It is however a challenging task to alter the optical properties between different states of such metasurfaces, and in particular for visible light applications which require feature sizes of less than a micrometre.

SUMMARY

An objective of the present inventive concept is thus to provide an optical device, whose optical response can be altered individually and reversibly to change the modulation of incident light whilst maintaining the overall efficiency.

This and other objectives of the invention are at least partly met by the invention as defined in the independent claims. Preferred embodiments are set out in the dependent claims.

According to a first aspect of the present inventive concept there is provided an optical device for modulating incident light, comprising:
- a resonance defining layer structure comprising an optical state change material;
- an electrode layer comprising at least two spaced-apart electrode elements;
- wherein said electrode elements are individually addressable and arranged to cause an optical state change of a portion of the optical state change material between a first state and a second state;
- wherein said portion forms a geometric structure defined by the arrangement of the at least two spaced-apart electrode elements,
- wherein the optical state change material is configured to alter an optical response of the optical device upon the optical state change between the first state and the second state, said optical response determining the modulation of the incident light.

Thereby, the optical response of the optical device may be altered by applying a voltage difference to the at least two electrodes, thus changing a portion of the optical state change material. The geometric structure defined by the arrangement of the at least two spaced-apart electrode elements allows for a pattern of optical state change material to be generated in the two different states. A given geometric structure, i.e. a given pattern, may correspond to a given optical response, and the optical response of the optical device may hence be altered. Hence, no geometric structure needs to be produced during manufacture, in turn allowing for an easy and more cost-efficient manufacturing.

By the electrode elements being individually addressable, a voltage difference may be applied across the at least two electrode elements. Thereby, a current, a current field, a magnetic field, an electric field, or the like, may be induced in the resonance defining layer structure and/or in the optical state change material to change a portion thereof from the first to the second state. Correspondingly, the portion of the optical state change material along the current, current field, and/or magnetic field may change state, thereby generating the geometric structure required to provide a desired optical response. By using the electrode elements as described herein, it is possible to form geometrical structures having a size of only a few hundred nanometres. Throughout this text "voltage difference" and "potential difference" is applied interchangeably, however both still referring to the concept of applying a difference in electric potential between two or more elements.

Moreover, the portion may change state again from the second state to the first state when another voltage difference, such as a lower or higher voltage difference, is be applied across the at least two electrode elements. This, in turn, allows for the optical device to obtain a first geometric structure, be "reset", i.e. with no geometric structure, and subsequently obtain another or the same geometric structure. Thus, the optical device may obtain various optical responses in a simple manner using the structure of the optical device.

In some embodiments, the first and second states of the optical state change material are stable states. The optical state change material may have more than two stable states. The optical state change may be achieved by e.g. Joule heating caused by the current, current field, electromagnetic field, or the like, affecting the optical state change material. In some embodiments, the optical state change material is arranged in a layer structure.

According to an embodiment, the optical state change material may be a phase change material, PCM, preferably formed of a compound comprising a transition metal oxide or chalcogenide glass, such as germanium-antimony-tellurium, GST, wherein an optical state change is a phase change of the phase change material.

Thereby, the optical state change may be carried out by means of a state change of the PCM. By using a PCM, a substantial difference in optical properties between the first and the second state may be achieved, thereby allowing for better control of the optical response and consequently the scattered light. The difference in optical properties may, for instance, be a complex refractive index or complex permittivity of the PCM.

According to an embodiment, the electrode elements may further be configured to repeatedly cause an optical state change of the portion of the optical state change material between the first state and the second state.

This, again, allows for the optical device to be used to obtain a larger variety of different optical responses. Where the optical state change material is a PCM, the phase change of the portion from the first state to the second state may be achieved by applying a given voltage difference to two of the at least two electrode elements.

According to an embodiment, the resonance defining layer structure may further comprise an electrically conducting and/or an electrically insulating layer.

A current may thus flow through the insulating and/or conducting layer of the electrically insulating layer, but not through the optical state change layer. The electrically insulating layer or the electrically conducting layer may in some embodiments be interposed between the optical state change material and the electrode layer. In other embodiments, a current induced by the at least two electrode elements may flow through the optical state change material to change its states. In other embodiments, the optical device may comprise two electrode layers disposed on each side of the resonance defining layer structure, such that an electric field may be generated across the resonance defining layer structure, when a voltage difference is applied between an electrode of each of the layers. Preferably, an electrically insulating layer may be provided between the resonance defining layer structure and the respective electrode layer.

According to yet an embodiment, the electrode elements may be configured to induce a current into at least one layer of the resonance defining layer structure so as to cause the optical state change of the portion of the optical state change material.

By inducing a current into at least one of the layers, a local heating may occur along the current path, which may cause the portion of the phase optical state change material to change its optical state. Thereby, a simple and relatively easily controllable optical state change of a desired portion can be achieved. As the current path may be well-defined and the heat may be controlled by the current intensity, a well-defined portion of the optical state change material may be caused to shift from a first state to a second state or vice versa. This, in turn, makes it possible to form geometric structures in the optical state change material, preferably in the main plane of extension of the resonance defining layer, wherein each geometric structure may have a specific optical property so as to modulate incident light in a desired way.

Alternatively, or in combination therewith, the optical state change of the optical state change material may be caused or at least triggered by means of a magnetic field induced by the current or a potential difference. In some embodiments, the current will run through the optical state change material, whereas the current in other embodiments may run in one or more of the other layers of the device.

According to an embodiment, the optical device may comprise at least three electrode elements, arranged to define at least two different geometric structures in the main plane of extension of the resonance defining layer.

The at least two different geometric structures may for example conform to a V-shape or an L-shape or other, less complex anisotropic shapes, which may be rotated relative to each other in the plane of the resonance defining layer. This allows for a phase modulation according to a Pancharatnam-Berry (PB) modulation scheme of the incident light. As the geometric pattern is furthermore rewriteable and reconfigurable, the optical response of the optical device may be altered in a well-defined and controllable manner.

The incident light is preferably incident substantially perpendicular to the surface of the resonance defining layer, such that the influence of the orientation of the at least two different geometric structures on the phase modulation may be increased.

According to an embodiment, the optical scattering device may be configured to modulate incident light having a wavelength in the range from 100 nm to 2000 nm, preferably from 300 nm to 750 nm.

Hence, the optical device can be used to modulate light in the range of light visible to the human eye. This, again, allows for the optical device to be used for creating 3D holographic images and/or videos.

According to yet an embodiment, the optical state change material in at least one of the first state and the second state may have plasmonic properties for incident light having a wavelength in the range from 100 nm to 2000 nm, preferably from 300 nm to 750 nm.

This, in turn, allows for the optical properties of the optical state change material to be highly dependent on the geometric structure formed in the optical state change material. The plasmonic properties may allow for an enhanced electromagnetic interaction with the light, and thus improved modulation capabilities in smaller volumes. Further, the visible wavelength range allows the optical device to be used to modulate light in the visible spectrum of humans to e.g. provide holograms, or the like.

According to an embodiment, the phase optical state change material may be arranged in a layer having a thickness smaller than a minimum wavelength of the incident light to be modulated.

Thereby, the optical absorption of the optical state change material may be reduced in embodiments for which the light is transmitted through the device. This, in turn, allows for a larger portion of the incident light to be modulated and scattered by the optical device.

According to an embodiment, the first state of the optical state change material may be a dominantly crystalline state, whereas the second state of the optical state change material may be a dominantly amorphous state.

Consequently, a strong response may be provided based on the material difference between the dominantly crystalline and dominantly amorphous state.

A dominantly crystalline state of the optical change material refers to a state, wherein at least half of the optical state change material is in a crystalline state. The at least half of the material may be construed as at least 50% by mass of the optical state change material. Similarly, a dominantly amorphous state is to be understood as more than half, such as more than 50% by mass, of the optical state change material being in an amorphous state. It is appreciated herein that the terms "crystalline state" and "amorphous state" with respect to optical state change material, preferably a phase change material, will be known to the skilled person. The specifics of these terms will therefore not be discussed further throughout the present disclosure.

In some embodiments, the optical state change material may have more than one dominantly crystalline state and/or more than one dominantly amorphous state. The dominantly crystalline states and/or dominantly amorphous states may in some embodiments exhibit different properties, such as optical properties, of the optical state change material.

According to yet an embodiment, the resonance defining layer structure and the electrode layer may be arranged in a stack structure, and wherein the electrode layer may be arranged above and/or below the resonance defining layer structure when seen in a direction perpendicular to the surface of the resonance defining layer structure.

Thereby, the electrode elements of the electrode layer may be able to induce a current in, and/or generate a field in or about the resonance defining layer with minimal losses, thus increasing the efficiency of the optical device. In some embodiments a current may run from one electrode of the electrode layer, through at least a portion of the resonance defining layer, such as a portion of the optical state change material, to a second electrode of the electrode layer. Alternatively, or in combination therewith, a varying electric current or an alternating current may be sent through an electrode of the electrode layer to generate a magnetic field, at least partly affecting a portion of the resonance defining layer, e.g. by altering the state of the portion of the resonance defining layer.

Furthermore, a first and second electrode layer may be provided on opposite sides of the resonance defining layer. In this case, a bias, such as a potential difference, may be applied between an electrode of the first layer and a corresponding electrode, opposite the electrode of the first layer, of the second layer to generate a localized electric field through at least a portion of the resonance defining layer.

In some embodiments, the electrode layer comprises at least four electrode elements, arranged at positions spanning a rectangle and/or a hexagon.

This, in turn, allows for the formation of a plurality of different geometric structures, such as V-shapes, L-shapes, X-shaped and I-shapes, in the optical state change material of the resonance defining layer. Thereby, various phase modulations of the incident light may be achieved by the change in optical properties of the optical state change material.

The positions spanning a rectangle and/or a hexagon may be such that each electrode may form a corner in the rectangle and/or the hexagon when seen in a direction substantially perpendicular to the resonance defining layer.

In some embodiments, there is provided an array for forming a distribution of a three-dimensional light field, comprising a plurality of the optical devices according to any of the above embodiments, wherein each of the at least three electrode elements of each of said optical devices are individually addressable such that the optical response of each of the optical devices can be altered independent of the other optical devices of the array.

This, in turn, allows for an array capable of presenting e.g. holograms or the like by modulating, such as phase modulating, incident light, whilst maintaining a high efficiency using optical devices, whose optical responses can be easily reset and/or altered.

According to an embodiment, the optical device may be configured to modulate polarized light. In particular, the optical device may be configured to form a geometric shape that is anisotropic so as to allow for an increased difference in optical response upon the optical state change between the first state and the second state. This embodiment is based on the realization that light can be represented by a traveling wave having an electric field that is perpendicular to the direction of propagation, wherein the polarization of the light wave describes the exact orientation of the electric field. The polarization may be described by a linear combination of orthogonal vectors in the plane perpendicular to the direction of propagation, and the light can be said to be linearly, circularly or elliptically polarized depending on the weights of these orthogonal vectors.

As light travels, its magnetic field and electric field may interact differently with the surroundings. Therefore, polarization becomes an important parameter as the light passes any structure, medium or interface where the magnetic field and the electric field see an anisotropic surrounding (such as an elliptically shaped geometric structure or nanoparticle). The weights of the orthogonal basis of polarization may determine how the light will interact with this anisotropy.

The polarization may therefore, in the context of the present disclosure, be an important factor affecting the resulting modulation of the light. For a specific (anisotropic) geometric structure, different polarizations can lead to significantly different optical responses. These effects may therefore be taken into consideration when designing the shape of the geometric structures. Advantageously, light comprising a fixed (or at least controlled) polarization may be used.

According to a second aspect of the present inventive concept, there is provided a method of modulating light incident to an optical device which may be similarly configured as the device described above with reference to the first aspect and the related embodiments. The method may comprise the following steps:

applying a first voltage difference to a pair of the at least two electrode elements of the optical device so as to cause an optical state change of the portion of phase optical state change material from a first state to a second state, and applying a second voltage difference, said second voltage difference being lower than the first voltage difference, to the pair of electrode elements, so as to cause an optical phase state change of the phase optical state change material from the second state to the first state.

Similarly to what is described with reference to the device according to the first aspect, the optical state change may be reversible and depend on the voltage difference applied to the pair of electrode elements. This, in turn, allows for a controllable optical state change of the portions of optical state change material. By the reversibility, no pattern needs to be made in the resonance defining layer during production, thus allowing for a simpler and more cost-efficient production. Furthermore, as the state of at least the portion of the optical state change material is defined by the electrodes of the electrode layer, no external sources may be needed to reset the phase change the material. This, in turn, allows for an easily configurable optical device.

According to an embodiment, the second voltage difference is applied for a longer period of time than the first voltage difference.

According to an embodiment, the electrode layer comprises at least three electrode elements, the method further comprising the steps of:

applying the first voltage difference to a second pair of electrode elements so as to cause an optical state change of a further portion of the phase optical state change material from the first state to the second state, and applying the second voltage difference to the second pair of electrode elements so as to cause an optical state change of the further portion of the phase optical state change material from the second state to the first state.

According to a third aspect of the present inventive concept, there is provided an array of optical devices, wherein each optical device in the array is an optical device according to the first aspect and wherein each optical device forms a unit cell, wherein each optical device in the array is individually controllable by controlling the electrode elements of the respective optical device.

Hence, the optical devices of the first aspect may be used in an array of individually controllable optical devices for defining an optical response of the array of optical devices, which may be used e.g. for generating a holographic image.

According to an embodiment, each of the optical devices comprises a set of electrode elements.

Thus, each optical device may be individually controlled by controlling the set of electrode elements. The set may comprise at least three electrode elements, arranged to define at least two different geometric structures in the main plane of extension of the resonance defining layer, such that the arrangement of the set of electrode elements may be used for defining at least two different geometric structures formed by the portion of each of the optical devices.

According to an embodiment, the set of electrode elements of a first optical device differs from the set of electrode elements of a second optical device. Hence, each of the first and second optical devices is controlled by its own set of electrode elements.

According to an embodiment, the array comprises a single resonance defining layer common to all unit cells in the array.

This implies that the resonance defining layer may be very easy to produce.

The different aspects of the present invention can be implemented in different ways including an optical device, a method of modulating light incident to an optical device, and an array of optical devices as described above and in the following, each yielding one or more benefits and advantages described in connection with at least one of the aspects described above, and each having one or more preferred embodiments corresponding to the preferred embodiments described in connection with at least one of the aspects described above.

Furthermore, it will be appreciated that embodiments described in connection with one of the aspects described herein may equally be applied to the other aspect.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

FIGS. 3a-d are perspective views of an optical device in which different geometrical structures are formed in the optical state change material.

DETAILED DESCRIPTION

Figure 1:
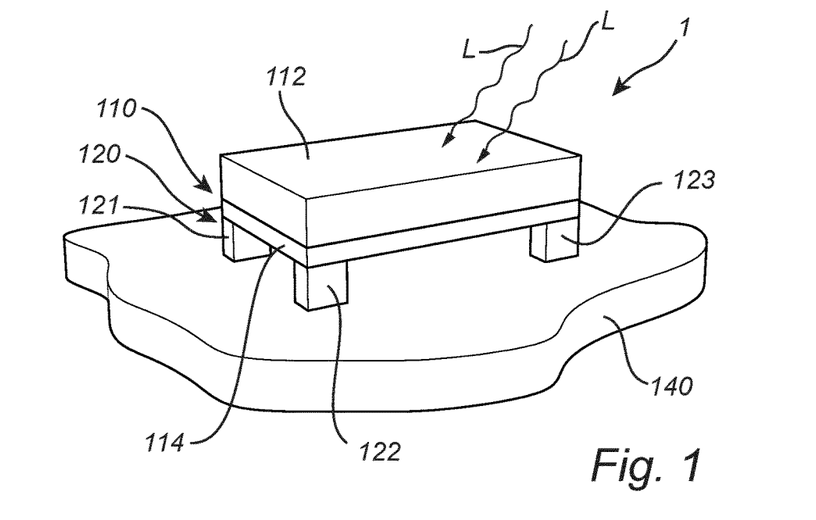
FIG. 1 is a perspective view of an optical device according to an embodiment.

Referring now to FIG. 1, an optical device 1 will be generally described. The optical device 1 may comprise a resonance defining layer structure 110 comprising an optical state change material 112 and, optionally, an electrically insulating or conducting layer 114. Further, the device 1 may comprise an electrode layer comprising at least two spaced-apart electrode elements, such as a first electrode element 121, a second element 122 and a third electrode element 123. In the present example, the resonance defining layer structure 110 and the electrode elements 121, 122, 123 may be arranged on a substrate 140, such that the electrode elements 121, 122, 123 are arranged between the substrate 140 and the resonance defining layer structure 110 and provide an electrical connection between conducting structures of the substrate 140 (not shown) and the resonance defining layer 110. As shown in the present figure, the optical state change material 112 and the electrically insulating or conducting layer 114 of the resonance defining layer structure 110 may be arranged in a stacked structure, with the electrically insulating or conducting layer 114 arranged between the electrode layer and the optical state change material 112.

The electrode elements 121, 122, 123 may be individually addressable via for example the substrate 140, in which conductive paths may be provided for supplying electrical power to the electrode elements 121, 122, 123. Thus, the electrode layer may be arranged to enable an electrical control of the optical state change material 112, which may be configured switch between at least a first and a second optical state when exposed to for example a current, a current field, a magnetic field or a heat provided by the electrode layer. Examples of these mechanisms will be discussed in connection with the following figures.

The electrode layer may for example be formed of an electrically conducing layer, for example of a metal, that may be patterned into at least two electrode elements 121, 122, 123 that are laterally separated from each other in the main plane of extension of the substrate 140. Put differently, the electrode elements may form electrically addressable points or regions of electrical contact on the resonance defining layer structure 110. The separation and/or extension of the contact points between at least two electrode elements 121, 122, 123 and the resonance defining layer structure 110 may define a geometric structure (not shown) that can be formed in the optical state change material 112 upon an optical state change in a portion of the optical state change material 112. Examples of such geometrical structures will be discussed in connection with for example FIG. 6. The geometric structure formed by the optical state change of the portion of the optical state change material 112 may be configured to alter an optical response of the optical device 1, determining the modulation of light L impinging on the device 1.

The optical state change material 112 may be provided as a substantially uniform layer forming a surface onto which the light to be modulated can be brought to impinge. The geometric structures, which can be used for affecting the modulation of the incident light L, may therefore be defined by the patterning of the electrode layer 120 (or the arrangement of the at least two electrical elements of the electrode layer) rather than by a direct patterning of the optical state change material 112 itself.

The optical state change material 112 may for example be a phase change material, PCM, such as for example a transition metal oxide or a chalcogenide glass. Examples of transition metal oxides include $VO_2$, $V_2O_3$, EuO, MnO, CoO, $CoO_2$, $LiCoO_2$, $Ca_2RuO_4$, $SrLrO_4$, $Ti_2O_3$, $LaCoO_3$, $PrNiO_3$, $Cd_2OsO_7$, $NdNiO_3$, $Tl_2Ru_2O_7$, $Ca_{1-x}Sr_xVO_3$, $Fe_3O_4$, $La_{1-y}Ca_yMnO_3$, $La_{2-2y}Sr_{1+2u}Mn_2O_7$, $Ti_4O_7$ and $La_2NiO_4$. Examples of chalcogenide glasses, and other phase change materials, include $NiS_{2-y}Se_y$, NiS, $BaCo_{1-y}Ni_yS_2$, $PrRu_4P_{12}$, $BaVS_3$, $EuB_6$, CuCl and compounds comprising GeSbTe, also referred to as GST. The PCM may be configured to switch from a crystalline state to an amorphous state when exposed to a high-power electrical pulse, and to return to the crystalline state when exposed to a series of low-power electrical pulses. Depending on the arrangement of the electrode elements 121, 122, 123, the resulting geometrical structure in the PCM may affect the optical response and thus the modulation of the incident light L.

The change of a state change material from one state to another may be determined by both the voltage amplitude and the duration of the electrical pulse. This can be exemplified by a PCM, in which the different phases may correspond to different percentages of crystallinity. Current and generated Joule heat may be used to switch the atoms of the PCM from being orderly packed (crystalline phase) to randomly packed (amorphous phase) and vice versa.

If the current injected in the PCM is high enough to melt the material, the atoms may go to a liquid phase. It the current, and thus the heat, is then promptly taken away, the atoms have no remaining energy to travel back to their preferred crystalline lattice position. They may hence be locked in the amorphous state. However, when the current, and thus the heat, is only gradually taken away, the atoms may have sufficient energy to travel to their preferred crystalline position. The resulting state may then be crystalline.

If the injected current is not high enough to melt the PCM material, it can still provide heat and thus energy to the atoms that is sufficient to allow them to move closer to their desired crystalline lattice location. The more energy provided, the more percentage of the atoms may be in a crystalline state.

Thus, it is appreciated that the state change may be effected by the amplitude of the applied voltage pulse alone, by the duration of the pulse alone or by a combination of both.

The electrode elements 121, 122, 123 may be arranged to cause an optical state change of a portion forming a sub-wavelength-scaled geometric structure in the plane of the resonance defining layer 110 and with reference to the wavelength of the of the incident to be modulated. The optical device 1 as shown in the present figure may form a unit cell of an array of a plurality of unit cells, wherein each unit cell may be individually controlled in terms of optical response to control a wave front of incident electromagnetic waves by imparting local phase shifts to the incoming waves.

The optical device 1 may for example be formed in an additive process, in which the electrode layer 120 is deposited and patterned to form the electrode elements 121, 122, 123. In a following step, the resonance defining layer 110 may be provided by first depositing for example an intermediate layer 114, such as an electrically conducting layer 114, above the electrode layer 120, and then the optical state change material 112 above the intermediate layer 114.

FIGS. 2a-d schematically illustrate an optical device according to an embodiment, which may be similarly configured as the device shown in FIG. 1. In the present embodiment, the resonance defining layer 110 comprises an optical state change material 112, such as for example the GST phase change material discussed above, and a first electrode element 121, a second electrode element 122 and a third electrode element 123. The electrode elements 121, 122, 123 are electrically connected to the GST layer 112 at laterally separated contact points, defining electrical current paths through the phase change material 112. FIGS. 2a-d shows the device when arranged in four different modulation states.

Figure 2A:
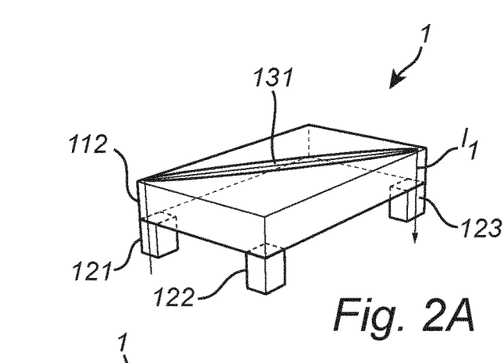
FIG. 2 is a top view of an array of a plurality of optical devices according to an embodiment.

In FIG. 2a, an electrical current $I_1$ is passed between the first electrode element 121 and the third electrode element 123 such that a phase change is triggered in a portion of the phase change material 112 extending along the current path.

The phase changed portion may for example assume an amorphous state along the current path, forming a first geometrical structure 131 extending between the first electrode element 121 and the third electrode element 123.

Figure 2B:
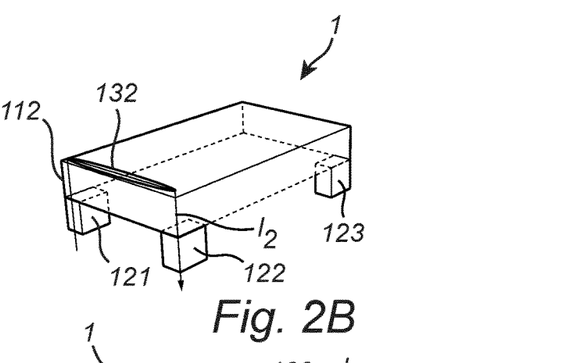

In FIG. 2b, an electrical current $I_2$, is passed between the first electrode element 121 and the second electrode element 122, resulting in a second geometrical structure 132 extending between the first and the second electrode element 121, 122.

Figures 2C, 2D:
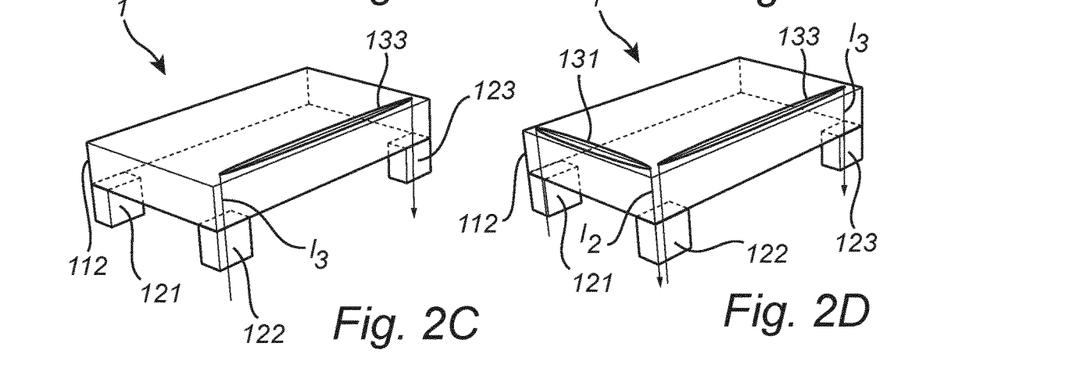

In FIG. 2c, an electrical current I3 is passed between the second electrode element 122 and the third electrode element 123, such that a third geometrical structure 133 is generated between the second and third electrode element 122, 123.

It will be appreciated that the above operation schemes of the optical device 1 are examples illustrating the embodiments of the inventive concept. Thus, different numbers of electrode elements and arrangements of the same may be employed to achieve the desired geometrical structures of phased changed regions in the phase change material 122. Further, a current may be passed between three or more electrode elements as well. An example of is shown in FIG. 2d, in which a current flow path is formed from the first electrode element 121 to both the second and the third electrode element 122, 123. The resulting geometrical shape is formed of a combination of the second geometrical shape 132 of FIG. 2b and the third geometrical shape 133 of FIG. 2c.

In the embodiment shown in FIGS. 2a-d, the optical state change material 112 is configured to alter the optical response of the optical device in response to an electrical current being passed through the material. The current path through the optical state change material may cause the optical state change by means of Joule heating in the material itself. However, other configurations are also possible.

Figure 3A:
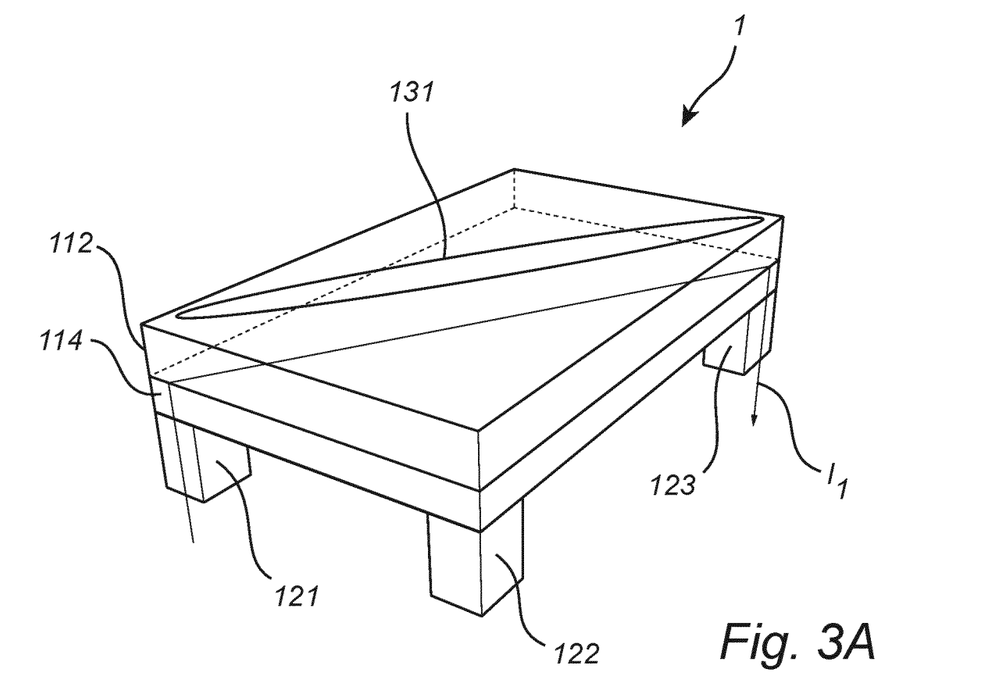
Figure 3B:
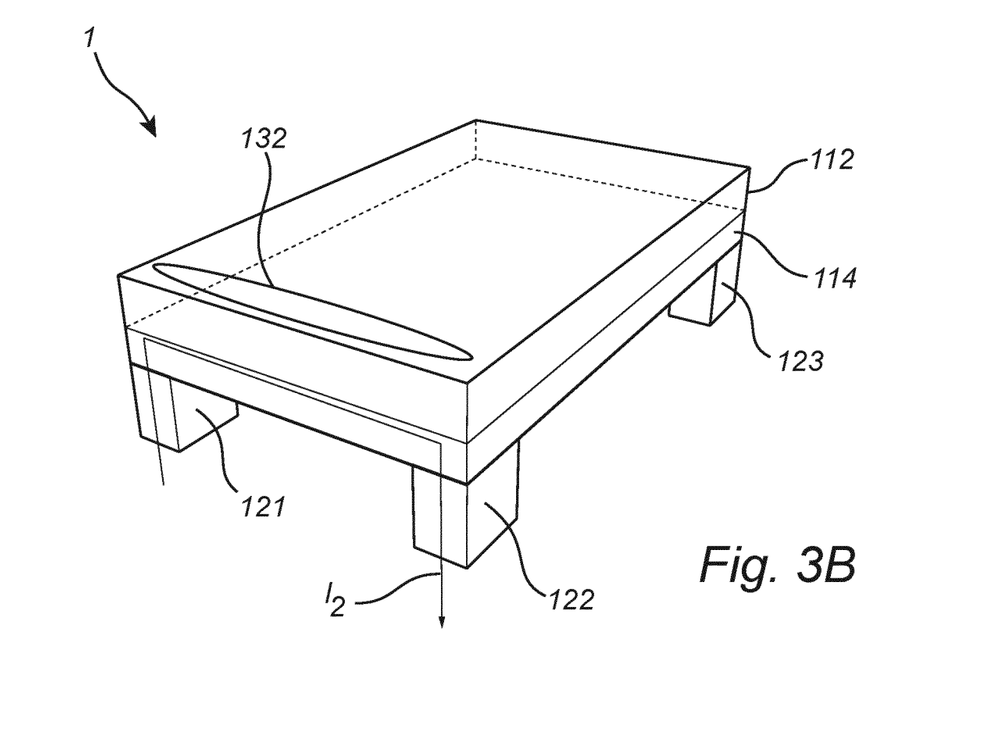

FIGS. 3a and b show an optical device that may be similarly configured as the devices of FIGS. 1 and 2, with the difference that the resonance defining layer structure 110 comprises an intermediate layer 114 arranged between the optical state change material 112 and the electrode layer 120. The intermediate layer 114, which also may be referred to as a stimulus defining layer, maybe configured o indirectly change the optical state of the optical state change material 112, for example through Joule heating of the intermediate layer 114 itself. By arranging the intermediate layer 114 close to the optical state change material 112, the intermediate layer 114 may act as a heating layer inducing for example a phase change in the optical state change material 112. The intermediate layer may for example be an insulating layer, or an electrically conducting layer through which a current $I_1$, $I_2$ may flow for example between the first electrical element 121 and the third electrical element 123 as illustrated in FIG. 3a, and between the first electrical element 121 and the second electrical element 122 as illustrated in FIG. 3b, to form the desired geometrical structures 131, 132 in the optical state change material 112.

Figure 4A:
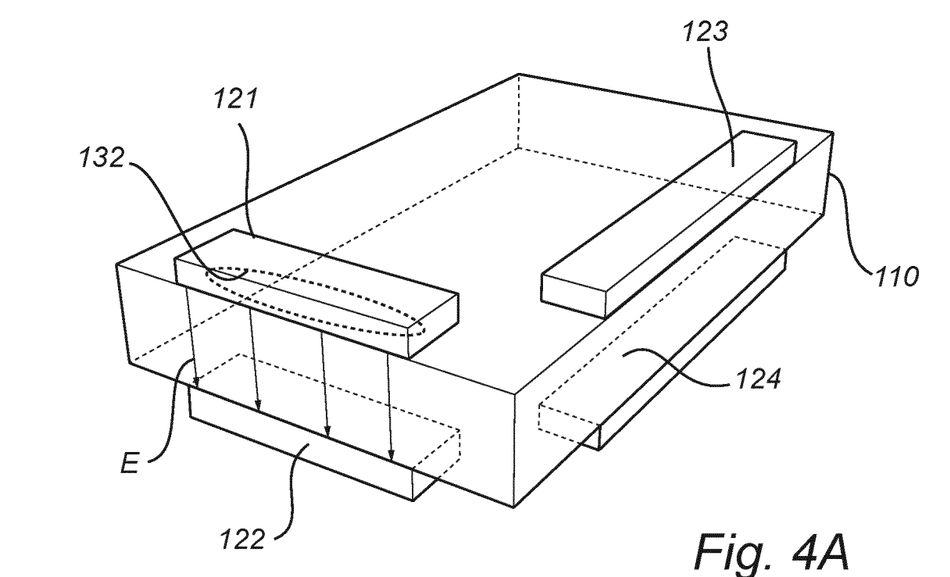
FIGS. 4a-b, 5a-b and 6a-b schematically illustrate optical devices according to some embodiments of the present invention.
Figure 4B:
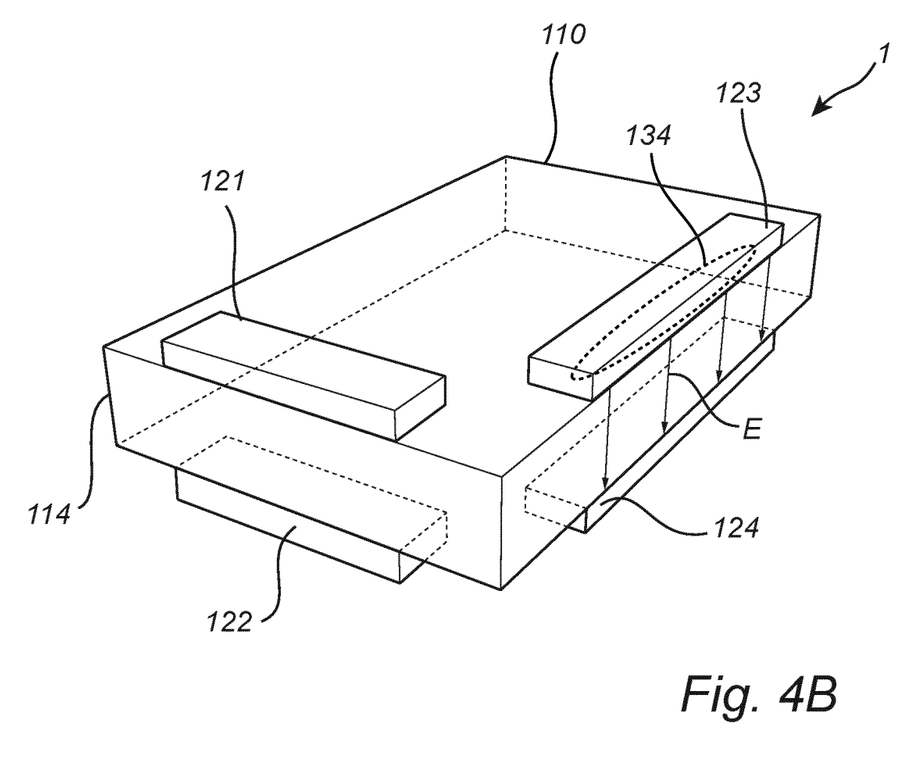

FIGS. 4a and b show another configuration of the electrical elements arranged in an optical device that otherwise may be similarly configured as the embodiments of the previous figures. In the present example, the optical state change material 112 may be configured to change optical state in response to an electric field generated by a voltage bias over at least two of the electrode elements 121, 122, 123, 124. The optical state change material 112 may hence be an electro-optic material exhibiting a change in absorption or refractive index under the presence of an external electric field.

In the present example, the first electrode element 121 may be arranged above a layer of the optical state change material 122 (as seen in a stacking direction from a surface of the substrate, not shown in FIGS. 4*a* and *b*), whereas the second electrode element 122 may be arranged below the optical state change material 112. Hence, the first and the second electrode element 121, 122 may form an electrode pair with a portion of the optical state change material 112 in between. When applying an electric potential difference over the first and second electrode element 121, 122, an electric field E may be generated between the electrodes, and passing through the portion of the optical state change material 112 arranged between the electrical elements 121, 122. The electric field E may be used to cause an optical state change of the portion of the optical state change material 112, resulting in a geometrical structure extending along at least one of the electrode elements 121, 122 in main plane of extension of the resonance defining layer structure 110.

One or several electrode element pair may be provided so as to allow the formation of other geometric structures. In FIG. 4*b*, a second electrode element pair 123, 124, arranged on opposite sides at another portion of the optical state change material 112, is used to generate an electric field E forming another geometric structure.

Figure 5A:
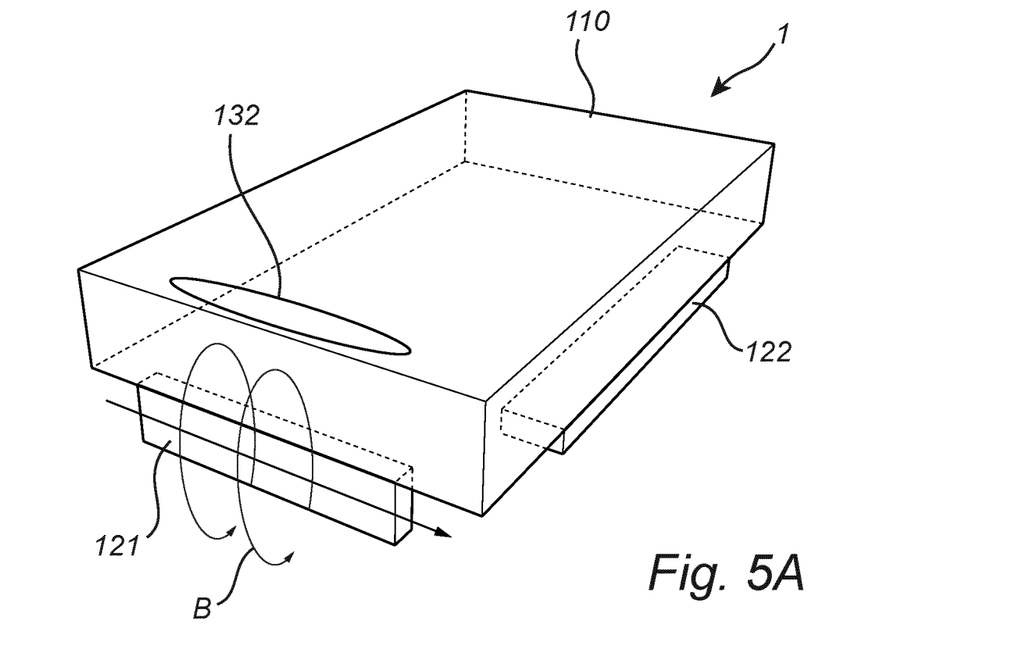
Figure 5B:
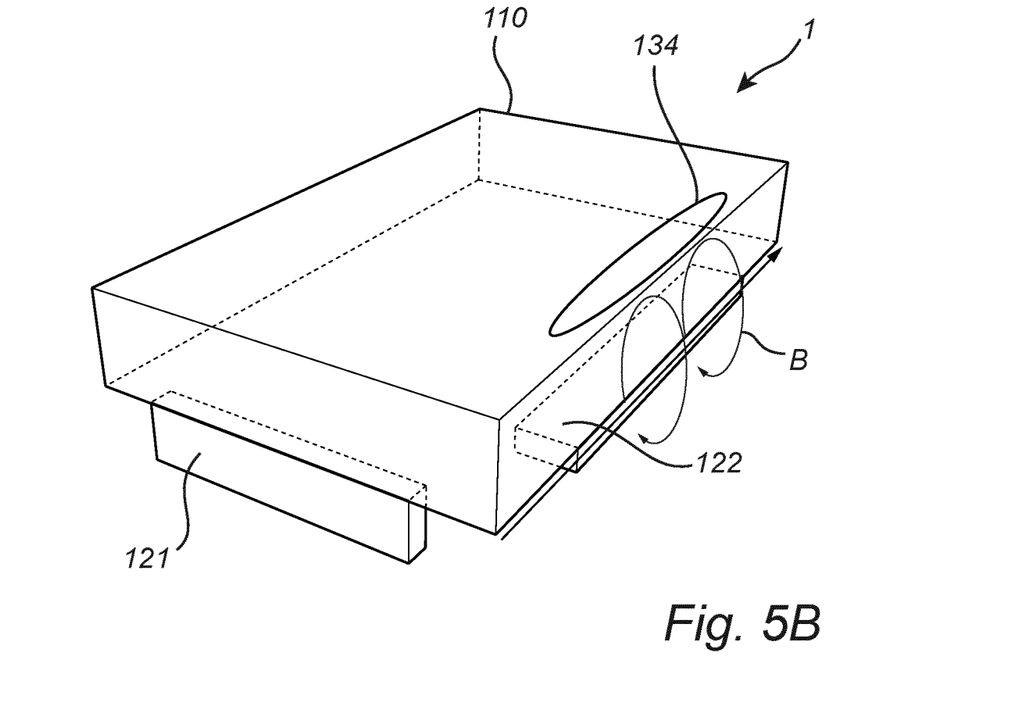

A further example of an optical state change mechanism is disclosed in FIGS. 5*a* and *b*, in which a magnetic field from an electrical conductor is used to cause a magneto-optic state change along a current path. Such an optical device may be similarly configured as the embodiments of FIGS. 1 to 4, with the difference that the first electrode element 121 and the second electrode element 122 may be arranged to allow a current $I_1$, $I_2$ to pass through the respective electrode element 121, 122 along the main plane of extension of the resonance defining layer structure 110. The magnetic field B generated by the electric current $I_1$, $I_2$ through the conductors formed by the electrode elements 121, 122 may be employed to induce an optical state change in the optical state change material 112.

As shown in the illustrating examples of the above figures, several mechanisms may be employed to form a geometric structure in the optical state change material, wherein the state change mechanism, as well as the extension and form of the resulting geometrical structure are determined by the arrangement and electrical operation of the electrode elements. Depending on the shape and orientation of the geometrical structure, different optical responses may be provided to achieve a modulation of light impinging on the optical device.

Figure 6:
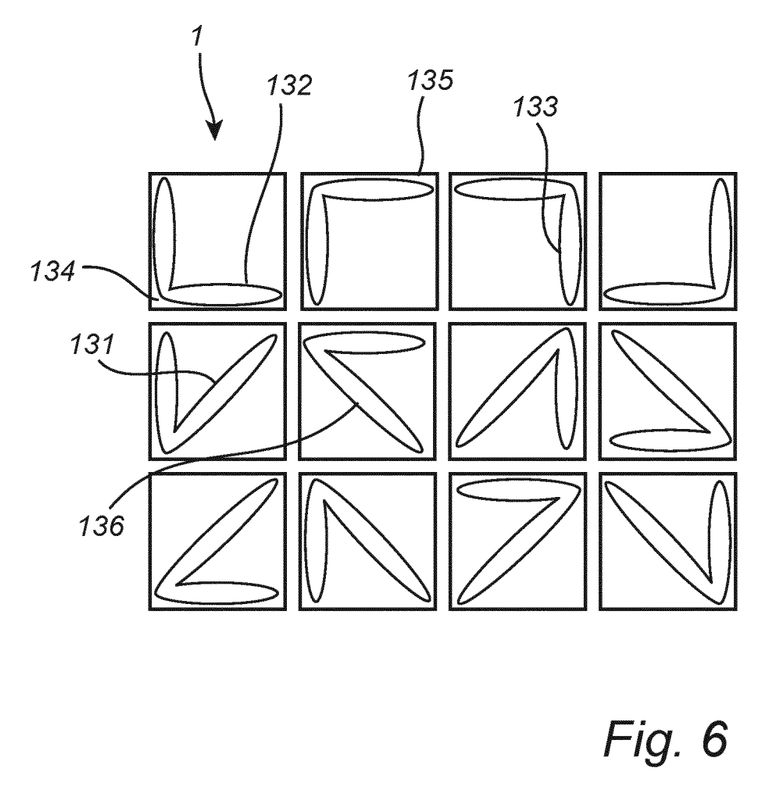

FIG. 6 is a schematic top view of a plurality of optical devices 1, which may be similarly configured as any of the above embodiments, arranged in a two-dimensional array. Each of the optical devices 1 may be individually controlled to allow for a unit cell whose optical response can be tuned accordingly. In the present example, each of the optical devices 1 comprises a set of electrode elements arranged to define six different portions in the optical state change material, each of which corresponding to a respective geometrical structure in the plane of extension of the resonance defining layer structure. It should be noted that a unit cell, formed by an optical device 1 of the array, may be defined by the arrangement of the electrode elements rather than the extension of the resonance defining structure. Thus, the array may comprise a single resonance defining layer that is common to all unit cells of the array, and a plurality of unit cells defined by the pattern of the electrode layer.

For illustrative purposes only, each of the unit cells may be considered to have a resonance defining layer with a shape conforming to a quadrilateral and an electrode element arranged in each corner (or, in the case of a configuration similar to the ones in FIGS. 4 and 5, extending along each side). The resulting geometrical structures 131-136 that can be formed upon an optical state change are indicated in FIG. 6. In the present, illustrative example, six different geometrical structures 131-136 can be achieved—four extending along the sides of the quadrilateral, and two along its diagonals. Depending on the operation of the array, i.e., the voltages supplied to the electrode elements, the generated geometrical structures may vary between different unit cells and over time. The geometrical structures 131-136 may for example be combined in pairs to form V-shapes and L-shapes for modulating the light. Other shapes and configurations are however possible.

Figure 7:
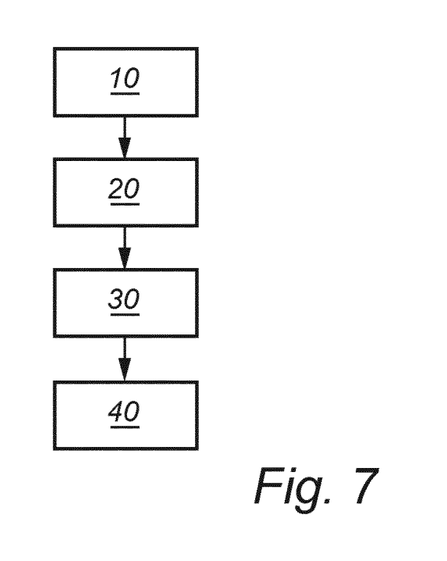
FIG. 7 is a flow chart illustrating a method according to an embodiment.

FIG. 7 is a flowchart illustrating a method for modulating light according to an embodiment, wherein the light is incident on an optical device according to any one of the previous figures. The method comprises applying 10 a first voltage different to a pair of the at least two electrode elements of the optical device to cause an optical state change of the portion of optical state change material from a first state to a second state, and applying 20 a second voltage different to the pair of electrode elements to cause an optical state change of the optical state change material from the second state to the first state. In an embodiment, the second voltage different may be lower than the first voltage different, and preferably provided in a plurality of pulses, so as to cause the optical state change material to return to the first state. The first state may for example be a predominantly crystalline state, whereas the second state may be a predominantly amorphous state. Further, the electrode layer may comprise at least three electrode elements, allowing the method to comprise the steps of applying 30 the first voltage difference to a second pair of electrode elements to cause an optical state change of a further portion of the optical state change material from the first state to the second state, and applying 40 the second voltage difference to the second pair of electrode elements to cause an optical state change of the further portion of the optical state change material from the second state to the first state.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A light modulation device, comprising:
a structure comprising a phase change material;
an electrode layer comprising at least two spaced-apart electrode elements, wherein the electrode elements are either below the structure or above the structure; and
another electrode element,
wherein;
an individual electrode element of the electrode elements is individually addressable and is to cause a change of a portion of the phase change material from a first state to a second state,
one of the first state and the second state is a substantially crystalline state,
another one of the first state and the second state is a substantially amorphous state, the electrode elements and the another electrode element together define at least two different geometric structures in the phase change material, and the at least two different geometric structures together form a V-shape to a top surface of the structure.

2. The light modulation device according to claim 1, wherein the phase change material includes germanium.

3. The light modulation device according to claim 1, wherein the structure includes at least one of an electrically conductive layer or an electrically insulative layer.

4. The light modulation device according to claim 1, wherein the light modulation device is to modulate incident light having a wavelength in a range 300 nm to 750 nm.

5. The light modulation device according to claim 1, wherein the light modulation device is to modulate incident light, and wherein the incident light includes polarized light.

6. The light modulation device according to claim 1, wherein the light modulation device is to modulate incident light, and wherein the phase change material is in a layer having a thickness smaller than a minimum wavelength of the incident light.

7. The light modulation device according to claim 1, wherein the structure includes a plurality of layers, wherein at least one layer of the plurality of layers includes a heater.

8. The light modulation device according to claim 1, further comprising another electrode layer, wherein the another electrode layer includes an additional electrode, and wherein the structure is between the additional electrode and the at least two spaced-apart electrode elements.

9. The light modulation device according to claim 1, wherein the phase change material includes a chalcogenide glass.

10. The light modulation device according to claim 1, wherein the phase change material includes antimony.

11. The light modulation device according to claim 1, wherein the phase change material includes tellurium.

12. A light modulation device, comprising:
a structure comprising a phase change material;
an electrode layer comprising at least two spaced-apart electrode elements, wherein the electrode elements are either below the structure or above the structure; and
another electrode element,
wherein:
an individual electrode element of the electrode elements is individually addressable and is to cause a change of a portion of the phase change material from a first state to a second state,
one of the first state and the second state is a substantially crystalline state,
another one of the first state and the second state is a substantially amorphous state,
the electrode elements and the another electrode element together define at least two different geometric structures in the phase change material, and
the at least two different geometric structures together form an L-shape to a top surface of the structure.

13. The light modulation device according to claim 12, wherein the phase change material includes germanium.

14. The light modulation device according to claim 12, wherein the phase change material includes antimony.

15. The light modulation device according to claim 12, wherein the phase change material includes tellurium.

16. The light modulation device according to claim 12, wherein the phase change material includes a chalcogenide glass.

17. The light modulation device according to claim 12, wherein the structure includes at least one of an electrically conductive layer or an electrically insulative layer.

18. The light modulation device according to claim 12, wherein the light modulation device is to modulate incident light having a wavelength in a range 300 nm to 750 nm.

19. The light modulation device according to claim 12, wherein the light modulation device is to modulate incident light, and wherein the incident light includes polarized light.

20. The light modulation device according to claim 12, wherein the light modulation device is to modulate incident light, and wherein the phase change material is in a layer having a thickness smaller than a minimum wavelength of the incident light.

21. The light modulation device according to claim 12, wherein the structure includes a plurality of layers, wherein at least one layer of the plurality of layers includes a heater.

22. The light modulation device according to claim 12, further comprising another electrode layer, wherein the another electrode layer includes an additional electrode, and wherein the structure is between the additional electrode and the at least two spaced-apart electrode elements.

* * * * *